United States Patent
Wakabayashi et al.

(10) Patent No.: US 10,415,110 B2
(45) Date of Patent: Sep. 17, 2019

(54) METHOD FOR PRODUCING HOLLOW STABILIZER

(71) Applicant: NHK Spring Co., Ltd., Kanagawa (JP)

(72) Inventors: Yutaka Wakabayashi, Kanagawa (JP); Ken Takahashi, Kanagawa (JP); Masato Sugawara, Kanagawa (JP); Hideki Okada, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 210 days.

(21) Appl. No.: 15/560,273

(22) PCT Filed: Mar. 16, 2016

(86) PCT No.: PCT/JP2016/058287
§ 371 (c)(1),
(2) Date: Sep. 21, 2017

(87) PCT Pub. No.: WO2016/152671
PCT Pub. Date: Sep. 29, 2016

(65) Prior Publication Data
US 2018/0073096 A1    Mar. 15, 2018

(30) Foreign Application Priority Data
Mar. 24, 2015 (JP) .................. 2015-061551

(51) Int. Cl.
*C21D 9/08* (2006.01)
*B21D 53/88* (2006.01)
(Continued)

(52) U.S. Cl.
CPC ............. *C21D 9/08* (2013.01); *B21D 7/00* (2013.01); *B21D 7/165* (2013.01); *B21D 53/88* (2013.01);
(Continued)

(58) Field of Classification Search
CPC ............. C21D 9/08; C21D 1/60; C23C 8/46
See application file for complete search history.

(56) References Cited

U.S. PATENT DOCUMENTS 7,744,708 B2    6/2010    Lopez et al.
7,896,983 B2    3/2011    Koyama et al.
(Continued)

FOREIGN PATENT DOCUMENTS

CN    1381362 A    11/2002
CN    104395487 A    3/2015
(Continued)

OTHER PUBLICATIONS

Chinese First Office Action for Application No. 201680010530.1, dated Feb. 3, 2019.
(Continued)

*Primary Examiner* — Jessee R Roe
(74) *Attorney, Agent, or Firm* — Marshall, Gerstein & Borun LLP

(57) ABSTRACT

A method of manufacturing a hollow stabilizer includes a forming step of subjecting an element pipe to a bending process, to form a product shape including bent portions, and a quenching step of quenching the element pipe subjected to the bending process. In the quenching step, a cooling process is performed by immersing the element pipe made of steel in coolant and by spraying the coolant to an outer surface of the bent portion.

16 Claims, 6 Drawing Sheets

(51) Int. Cl.
*B60G 21/055* (2006.01)
*B21D 7/00* (2006.01)
*B21D 7/16* (2006.01)
*C21D 1/60* (2006.01)
*C23C 8/46* (2006.01)

(52) U.S. Cl.
CPC ............ *B60G 21/055* (2013.01); *C21D 1/60* (2013.01); *C23C 8/46* (2013.01); *B60G 2206/427* (2013.01); *B60G 2206/724* (2013.01); *B60G 2206/8103* (2013.01); *B60G 2206/8402* (2013.01); *B60G 2206/8403* (2013.01)

(56) References Cited

U.S. PATENT DOCUMENTS

| | | |
|---|---|---|
| 2002/0170177 A1 | 11/2002 | Koyama et al. |
| 2006/0200990 A1 | 9/2006 | Koyama et al. |
| 2013/0093153 A1 | 4/2013 | Ito et al. |
| 2013/0160903 A1 | 6/2013 | Seo |
| 2015/0176101 A1 | 6/2015 | Ishitsuka et al. |
| 2015/0247227 A1 | 9/2015 | Katsumura et al. |

FOREIGN PATENT DOCUMENTS

| | | |
|---|---|---|
| EP | 1755801 A1 | 2/2007 |
| JP | S56127731 A | 10/1981 |
| JP | S58141332 A | 8/1983 |
| JP | S63186831 A | 8/1988 |
| JP | H01111848 A | 4/1989 |
| JP | 2000024737 A | 1/2000 |
| JP | 2001-152315 | 6/2001 |
| JP | 2002-331326 A | 11/2002 |
| JP | 2004-009126 A | 1/2004 |
| JP | 2011189892 | 9/2011 |
| JP | 2012-052197 A | 3/2012 |
| WO | WO-2005110638 A1 | 11/2005 |
| WO | WO-2013175821 A1 | 11/2013 |
| WO | WO-2014/054287 A1 | 4/2014 |
| WO | WO-2014/121778 A1 | 8/2014 |

OTHER PUBLICATIONS

Extended European Search Report for Application No. 16768574.2, dated Oct. 22, 2018.
International Search Report for Application No. PCT/JP2016/058287, dated May 31, 2016.
Japanese Office Action with Translation for Application No. 2015-061551, dated Apr. 3, 2018.

METHOD FOR PRODUCING HOLLOW STABILIZER

CROSS-REFERENCE TO RELATED APPLICATION

The present application is the US national phase of International Application No. PCT/JP2016/058287, filed Mar. 16, 2016, which claims priority to Japanese Application No. 2015-061551, filed Mar. 24, 2015. The priority application, JP 2015-061551, is hereby incorporated by reference.

TECHNICAL FIELD

The present invention relates to a method for producing a hollow stabilizer with hollow structure.

BACKGROUND ART

A vehicle such as an automobile is equipped with a stabilizer (a stabilizer bar or an anti-roll bar) for suppressing roll of a vehicle body due to vertical movement of wheels. The stabilizer generally includes a torsion portion extending in a vehicle width direction and a pair of left and right arms bent and formed in a vehicle front-rear direction, and is formed of a substantially U-shaped rod body. In the vehicle, the distal ends of the arms are respectively connected to suspension devices of the wheels, and the torsion portion is inserted into bushes fixed to the vehicle body, so that the stabilizer is suspended between left and right suspension devices and is supported by the bushes.

When the vehicle turns or rides over undulation of a road surface during driving, a stroke difference occurs between the left and right suspension devices due to vertical movement of left and right wheels. At this time, loads (displacements) due to the stroke difference between the suspension devices are respectively input to the arms of the stabilizer, and the torsion portion is twisted by the loads (a displacement difference) from the arms, so that an elastic force to restore torsional deformation is generated. The stabilizer suppresses a vertical displacement difference between the left and right wheels by the elastic force to restore the torsional deformation, and increases roll rigidity of the vehicle body, so that the roll of the vehicle body is suppressed.

As a form of the stabilizer, there are a solid stabilizer having a solid structure and a hollow stabilizer having a hollow structure. The solid stabilizer is characterized by excellent mechanical strength and low manufacturing cost. In contrast, the hollow stabilizer is not easy to secure the mechanical strength as compared with the solid stabilizer, but is a form suitable for reducing weight of the vehicle. As a material of the hollow stabilizer, an electroseamed steel pipe, a seamless steel pipe, a butt-welded steel pipe or the like is generally used. Among them, the electroseamed steel pipe is often used as the material of the hollow stabilizer because it is low in manufacturing cost and excellent in mass productivity.

The hollow stabilizer is often manufactured by subjecting such a steel pipe to a bending process to form a product shape, and by subjecting it to heat treatment. As a bending process, for example, cold bending using an NC bender or hot bending using a total bending die is performed depending on thickness and diameter of the steel pipe. In general, oil quenching or water quenching and tempering are performed as the heat treatment. Or, a steel pipe subjected to cold bending may be subjected to an as-roll type process in which annealing is performed instead of quenching and tempering. Then, the steel pipe subjected to the heat treatment is commercialized through a finishing process such as a surface treatment process by shot peening, or a coating process.

In recent years, in vehicles such as an automobile, the weight of the vehicle tends to be heavy due to, for example, mounting of an electric motor or a secondary battery. Along with this, in order to withstand higher stress, further improvement of the mechanical strength, fatigue durability or the like is also required for the hollow stabilizer. Conventionally, as the material of the hollow stabilizer, a thin-walled electroseamed pipe, in which a ratio (t/D) of a thickness (t) to an outer diameter (D) of the pipe is relatively small, the thickness of the pipe is less than about 5.5 mm, and dimensional accuracy and formability are good, has been used. However, at present, thicker steel pipes are manufactured for a wide variety of outer diameters by hot diameter reduction rolling of the electroseamed pipe having a large diameter and a thick wall. Since a selection range of the ratio (t/D) of the thickness (t) to the outer diameter (D) of the steel pipe is extended, design range of the hollow stabilizer focusing on securing the mechanical strength is also extended.

For example, as a technology for providing the steel pipe of low cost and good quality, Patent Document 1 discloses an electroseamed welded steel pipe for the hollow stabilizer in which the ratio t/D of the thickness t to the outer diameter D is 20% or more. Further, Patent Document 1 describes that the electroseamed welded steel pipe for the hollow stabilizer, in which the ratio t/D of the thickness t to the outer diameter D is 20% or more, can be obtained by employing the electroseamed welded steel pipe obtained by diameter reduction rolling after electric resistance welding, and by hot reduction rolling of the steel pipe by a stretch reducer, it is possible to reduce the outer diameter of the steel pipe, resulting in increasing the t/D as compared to before the reduction rolling.

Further, as a technology for obtaining durability of the stabilizer, Patent Document 2 discloses a method of manufacturing the hollow stabilizer, including a pipe compressing step of compressing an electroseamed pipe in a temperature range of a hot state or a warm state so as to make a ratio of a thickness to an outer diameter 18 to 35%, a forming step of forming the compressed electroseamed pipe into a stabilizer shape in a cold state, a step of applying heat treatment to a formed half-finished stabilizer, a shot peening step of impacting shot on the half-finished stabilizer, and a step of coating the half-finished stabilizer.

CITATION LIST

Patent Literature

Patent Document 1: Japanese Patent Application Publication No. 2004-009126

Patent Document 2: Japanese Patent Application Publication No. 2002-331326

SUMMARY OF INVENTION

Technical Problem

In general, a bent portion of the hollow stabilizer is a portion where large bending stress and torsional stress are both generated and the stresses are high in actual use.

Therefore, the bent portion is a portion where strength and fatigue strength (durability) of the hollow stabilizer is most desired. In a manufacturing method in which quenching is applied to the steel pipe as the material of the hollow stabilizer, the heat treatment by electric heating may be performed. During electric heating, a current density is increased to generate a local high temperature at the bent portion of the hollow stabilizer in some cases. During cooling in quenching, since the bent portion is recessed, cooling rate tends to be low. Therefore, there is a possibility that quenching of the bent portion is insufficient and hardness is reduced.

When the steel pipe is quenched, after closing openings at pipe ends of the steel pipe in advance, a cooling process may be performed by immersing the steel pipe in coolant. Since the steel pipe sealed at both pipe ends is cooled from an outer surface, an inner surface has low quenching hardness compared to the outer surface, and it is difficult to secure hardness. Therefore, the inner surface of the steel pipe, particularly an inner surface of the bent portion tends to be a starting point of fatigue failure as compared to the outer surface or the like of the hollow stabilizer.

Thus, reduction of quenching hardness occurring in the inner surface of the steel pipe is more significant as the ratio (t/D) of the thickness (t) to the outer diameter (D) of the pipe is increased. In general, a method is known in which shot peening is applied to the inner surface of the steel pipe to secure hardness of the inner surface, however, man-hours and manufacturing costs are greatly increased in this method, and it is also difficult to perform both this method and a quenching process in a manufacturing process. Therefore, there is a demand for a technology capable of making the bent portion of the steel pipe a good quenching hardness.

Therefore, an object of the present invention is to provide a method of manufacturing the hollow stabilizer, which can give the bent portion of the steel pipe as the material of the hollow stabilizer a good quenching hardness.

Solution to Problem

In order to solve the above problems, a first method of manufacturing a hollow stabilizer according to the present invention is a method of manufacturing a tubular hollow stabilizer, which is provided in a vehicle and includes a torsion portion extending in a vehicle width direction, an arm extending in a vehicle front-rear direction, and a bent portion connecting the torsion portion and the arm, wherein the method includes a forming step of subjecting an element pipe as a material of the hollow stabilizer to a bending process, to form a product shape including the bent portion, and a quenching step of quenching the element pipe subjected to the bending process, and in the quenching step, a cooling process is performed by immersing the element pipe in coolant and by spraying the coolant to an outer surface of the bent portion.

Further, a second method of manufacturing a hollow stabilizer according to the present invention is a method of manufacturing a tubular hollow stabilizer, which is provided in a vehicle and includes a torsion portion extending in a vehicle width direction, an arm extending in a vehicle front-rear direction, and a bent portion connecting the torsion portion and the arm, wherein the method includes a forming step of subjecting an element pipe as a material of the hollow stabilizer to a bending process, to form a product shape including the bent portion, and a quenching step of quenching the element pipe subjected to the bending process, and in the quenching step, a cooling process is performed by immersing the element pipe in coolant and by injecting the coolant into the element pipe.

Advantageous Effects of Invention

According to the present invention, it is possible to provide a method of manufacturing a hollow stabilizer, which can give a bent portion of a steel pipe as a material of the hollow stabilizer a good quenching hardness. In addition, according to this method, it is possible to provide a lightweight hollow stabilizer having increased hardness and high strength at the bent portion.

DESCRIPTION OF EMBODIMENTS

Figure 1A:
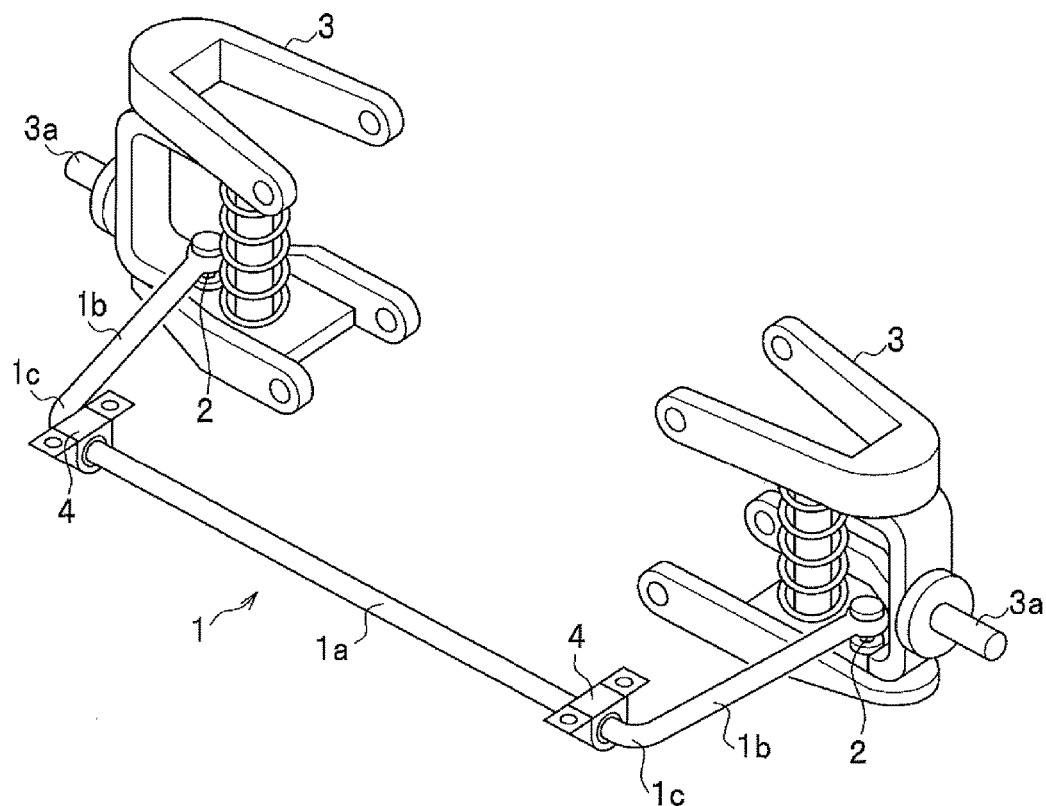
FIG. 1A is a perspective view showing an example of a hollow stabilizer connected to suspension devices provided in a vehicle.

First, a hollow stabilizer manufactured by a method of manufacturing the hollow stabilizer according to an embodiment of the present invention will be described with reference to the drawings. Components common to the drawings are denoted by the same reference numerals, and redundant descriptions will be omitted.

Figure 1B:
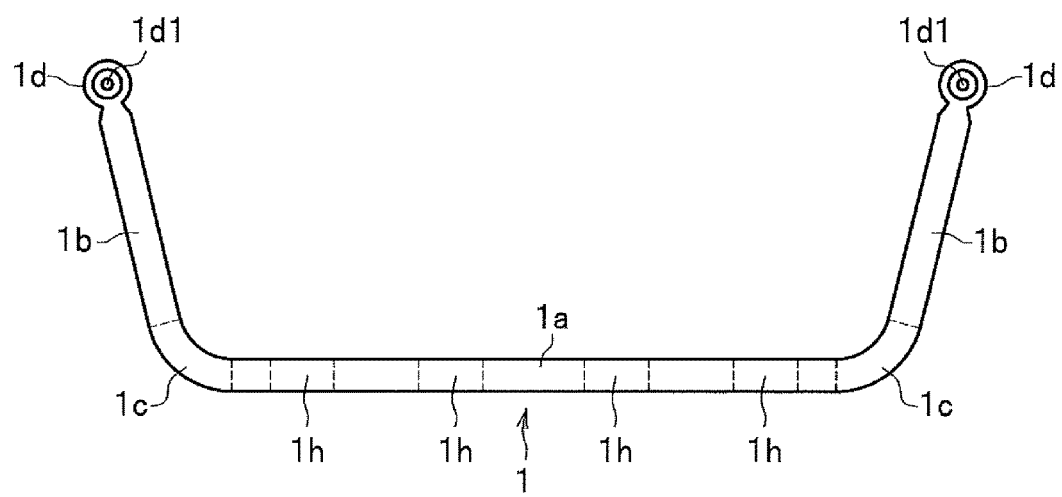
FIG. 1B is a plan view showing an example of the hollow stabilizer connected to the suspension devices provided in the vehicle.

FIGS. 1A, 1B are views showing an example of the hollow stabilizer. FIG. 1A is a perspective view of the hollow stabilizer connected to suspension devices provided in a vehicle, and FIG. 1B is a plan view of the hollow stabilizer.

By the method of manufacturing the hollow stabilizer according to the present embodiment, a hollow stabilizer 1 for the vehicle shown in FIGS. 1A, 1B can be manufactured. The hollow stabilizer 1 is a tubular stabilizer formed by using a hollow steel pipe or the like. The hollow stabilizer 1 includes a torsion portion 1a extending in a vehicle width direction and a pair of left and right arms 1b, 1b extending in a front-rear direction of the vehicle.

DETAILED DESCRIPTION

The hollow stabilizer 1 is bent at bent portions 1c, 1c (shown by broken lines in FIG. 1B) symmetrically located at both ends of the torsion portion 1a extending in the vehicle width direction, and has a substantially U-shape connected to the pair of left and right arms 1b, 1b. The hollow stabilizer 1 may be configured to have two or more bent portions 1c.

The hollow stabilizer 1 has an outer diameter D of about 10 mm to about 43 mm, and a plate thickness t of about 2 mm to about 10 mm at the torsion portion 1a. A ratio t/D described below means a ratio of the plate thickness t to the outer diameter D. At distal ends of the arms 1b, 1b, flat plate-like connecting portions (eyeball portions) 1d, 1d to be mounting portions are respectively provided. The connecting portions (eyeball portions) 1d, 1d are formed into a flat plate shape (flat shape) having mounting holes 1d1, 1d1 by press working.

The connecting portions 1d, 1d at the distal ends of the arms 1b, 1b are respectively connected to a pair of left and right suspension devices 3, 3 fixed to a vehicle body (not shown) via stabilizer links 2, 2. Wheels (not shown) are respectively attached to axle portions 3a of the suspension devices 3. The suspension device 3 has a compression spring and an oil damper, so that impact, vibration and the like from the wheel are reduced by internal friction and viscous drag and softly transmitted to the vehicle body.

The torsion portion 1a is inserted through rubber bushes 4 fixed to cross members or the like (not shown) of the vehicle body and is suspended between the pair of left and right suspension devices 3, 3. With this configuration, when a stroke difference occurs between the pair of left and right suspension devices 3, 3 due to vertical movement of right and left wheels, loads due to displacements are respectively transmitted from the suspension device 3, 3 to the arms 1b, 1b, and the torsion portion 1a is torsionally deformed. Then, an elastic force for restoring the torsional deformation is generated in the torsion portion 1a. By this elastic force against the torsional deformation, the hollow stabilizer 1 suppresses a left-right inclination of the vehicle body and increases roll rigidity to stabilize running of the vehicle.

The hollow stabilizer 1 is made of a steel pipe such as an electroseamed pipe, an SR (Stretch Reduce) pipe (hot rolled electroseamed steel pipe), an electroseamed drawn steel pipe or the like. The electroseamed steel pipe is produced by forming a steel plate into a pipe shape by hot rolling, and by joining edges in a short direction, which are seams in a longitudinal direction of the pipe, by electric resistance welding. Then, outer surface beads on seams of the pipe are removed by cutting since they are functional obstacles. The SR pipe is produced by preparing an electroseamed pipe of a large diameter and performing high frequency heating. Then, the electroseamed pipe is thickened to a small diameter pipe by hot drawing, so that an electroseamed pipe of thick wall and small diameter is produced. The electroseamed drawn steel pipe is a pipe obtained by reducing a diameter of the SR pipe or the electroseamed pipe as a base material, for example, by cold drawing performed by inserting a plug. An area reduction ratio of a cross-sectional area due to drawing of the electroseamed drawn steel pipe is generally in a range of about 30% or more and about 45% or less.

For example, the electroseamed pipe is used for the hollow stabilizer 1 having an outer diameter of about 12 mm to about 44 mm and a plate thickness t of about 2 mm to about 6.5 mm. The hollow stabilizer 1 has t/D of about 0.09 to 0.22. The SR pipe is used for the hollow stabilizer 1 having an outer diameter of about 12 mm to about 44 mm and a plate thickness t of about 2 mm to about 10 mm. The hollow stabilizer 1 has t/D of about 0.12 to 0.31.

Figure 2:
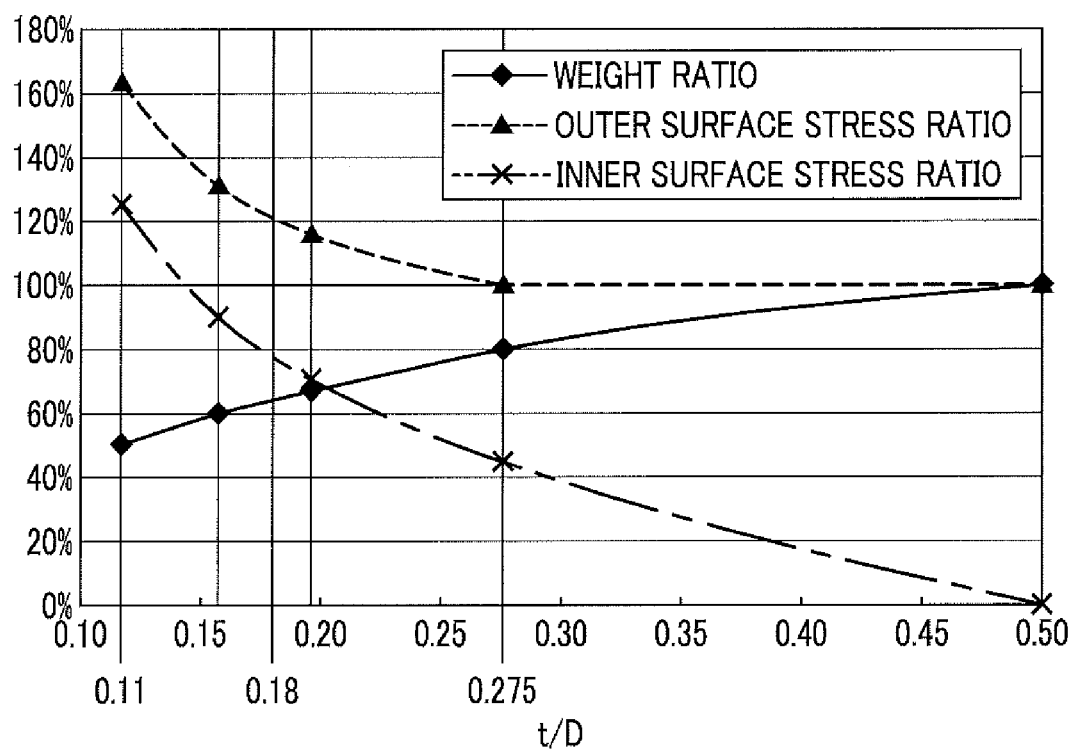
FIG. 2 is a graph comparing a solid stabilizer and an equivalent sized hollow stabilizer in weight, outer surface stress and inner surface stress.

FIG. 2 is a graph comparing a solid stabilizer and an equivalent sized hollow stabilizer in weight, outer surface stress and inner surface stress. The horizontal axis represents t/D (plate thickness/outer diameter), and the vertical axis represents weight (solid line), external surface stress (broken line), internal surface stress (one-dot chain line). FIG. 2 shows how the weight, the outer surface stress and the inner surface stress change in the hollow stabilizer, assuming that those of the solid stabilizer are 100%. Therefore, the weight and the outer surface stress of the solid stabilizer are 100%, and the inner surface stress is 0% since the solid stabilizer has no inner surface and no inner surface stress is generated.

The weight is 100% in the solid stabilizer, and a weight ratio decreases quadratically as the t/D decreases (plate thickness t decreases) since a change in the plate thickness t is a change in the diameter. When the solid stabilizer is changed to the hollow stabilizer in which the t/D decreases, since the cross-sectional area decreases, the outer surface stress and the inner surface stress tend to increase.

The outer surface stress is constant from the solid stabilizer to the hollow stabilizer 1 having the t/D of 0.275 or more, and the outer surface stress is increased as the t/D is reduced from the t/D of about 0.275 as a boundary. When the hollow stabilizer 1 having the t/D of about 0.275 is used, the weight can be reduced by about 20%.

The inner surface stress is 0% in the solid stabilizer 1, and as the cross-sectional area is reduced in response to reduction of the t (plate thickness) (decrease of the t/D), the inner surface stress is increased. When the t/D is about 0.275 or less, the internal stress changes more than the external stress. When the t/D is about 0.18 or less, fatigue failure from the inner surface occurs. When the t/D is about 0.18 or less, both the inner surface stress and the outer surface stress are rapidly increased. Therefore, it is more important to increase hardness of the inner surface of the stabilizer 1 when the t/D is about 0.18 or less.

The inner surface stress is 0% in the solid stabilizer 1, and as the cross-sectional area is reduced in response to reduction of the t (plate thickness) (decrease of the t/D), the inner surface stress is increased. When the t/D is about 0.275 or less, the internal stress changes more than the external stress. When the t/D is about 0.18 or less, fatigue failure from the inner surface occurs. When the t/D is about 0.18 or less, both the inner surface stress and the outer surface stress are rapidly increased. Therefore, it is more important to increase hardness of the inner surface of the stabilizer 1 when the t/D is about 0.18 or less.

From the above, when the ratio t/D is about 0.18 or less, since both the internal stress and the external stress are rapidly increased, it is necessary to further increase the hardness of the inner surface and outer surface of the stabilizer 1. Further, since the plate thickness t of the hollow stabilizer 1 is increased so that the t/D is about 0.18 to 0.275, there is a possibility that quenching on an inner portion of the bent portion 1c is insufficient as described above. Meanwhile, when the t/D is 0.275 or more, since the outer surface stress is the same as that of the solid stabilizer and the inner surface stress is low, it is considered that management of the inner surface stress may not be necessary.

As shown in FIG. 1B, the torsion portion 1a and the arm 1b of the hollow stabilizer 1 have a substantially straight tubular shape. On the other hand, the bent portion 1c has a bent shape having a curvature in an axial direction of the hollow stabilizer 1. In this specification, as shown by the broken lines in FIG. 1B, the bent portion 1c means a region sandwiched by a boundary of the torsion portion 1a having the substantially straight tubular shape and a portion having the curvature in the axial direction of the hollow stabilizer 1, and a boundary of the arm 1b having the substantially straight tubular shape and the portion having the curvature in the axial direction of the hollow stabilizer 1. Therefore, when the hollow stabilizer 1 has a multi-step bent product shape, the bent portion 1c may include a straight tubular section.

In actual use of the hollow stabilizer 1, since a load applied to one end side of the arm 1b is coupled to the other end side thereof, bending stress and torsional stress are generated in the bent portion 1c, and the bent portion 1c is a region in which the maximum principal stress in the hollow stabilizer 1 is usually distributed. Therefore, when the ratio (t/D) of the thickness (t) to the outer diameter (D) of the pipe is in a predetermined range, in order to increase fatigue strength of the hollow stabilizer 1, it is important to secure the hardness of the inner surface of the steel pipe, in particular, the hardness of the inner surface of the bent portion 1c.

Particularly in case of the SR pipe, there is a possibility that the hollow stabilizer 1 is not completely quenched at inner portions of the bent portions 1c, 1c (see FIGS. 1A and 1B). This is thought to be caused by a decrease in cooling rate due to thickening or shape in which coolant hardly hit the inner portion of the bent portion. When the hollow stabilizer 1 is not completely quenched, durability of the hollow stabilizer 1 is adversely affected.

Therefore, in the method of manufacturing the hollow stabilizer according to the present embodiment, when quenching the steel pipe as a material of the hollow stabilizer 1, a cooling process is performed by spraying the coolant to the steel pipe, to increase the hardness of not only the outer surface but also the inner surface of the bent portion 1c, so that quenching hardness is increased in the inner portion of the bent portion 1c.

Figure 3:
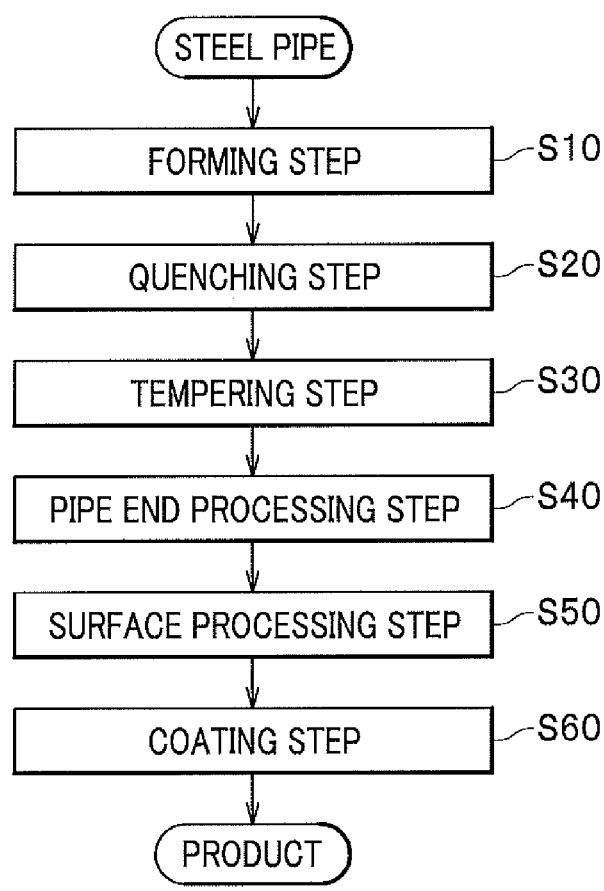
FIG. 3 is a process chart showing a method of manufacturing a hollow stabilizer according to an embodiment of the present invention.

FIG. 3 is a process chart showing the method of manufacturing the hollow stabilizer according to the embodiment of the present invention.

The method of manufacturing the hollow stabilizer shown in FIG. 3 includes a forming step S10, a quenching step S20, a tempering step S30, a pipe end processing step S40, a surface processing step S50 and a coating step S60. In this manufacturing method, the hollow stabilizer 1 is manufactured by sequentially performing these steps.

Length and diameter of an element pipe as the material of the hollow stabilizer 1 can be appropriately sized depending on a desired product shape. As described above, in case of the electroseamed pipe, the outer diameter of the torsion portion 1a is about 12 mm to about 44 mm, and the plate thickness t is about 2 mm to about 6.5 mm. The t/D is about 0.09 to about 0.22. In the case of the SR pipe, for example, the outer diameter of the torsion portion 1a is about 12 mm to about 44 mm, and the plate thickness t is about 2 mm to about 10 mm. The t/D is about 0.12 to about 0.31.

It is preferred that the ratio (t/D) of the thickness (t) to the outer diameter (D) of the element pipe of the hollow stabilizer 1 is 0.10 or more. When the element pipe is bent during bending, a bent outer portion of the element pipe is thin in the thickness (t) of the pipe by being pulled in a bending direction, while a bent inner portion of the element pipe tends to be thick in the thickness (t) of the pipe by being compressed in the bending direction. When the ratio (t/D) of the thickness (t) to the outer diameter (D) of the pipe is 0.10 or more, since cross-sectional shape of the element pipe is hardly flattened in this way, the element pipe can be suitably used as the material.

The element pipe of the hollow stabilizer 1 can be made of an appropriate material such as manganese boron steel or spring steel. Among them, a preferable material is the manganese boron steel. Carbon (C) content of the manganese boron steel is preferably 0.20 mass % or more and 0.35 mass % or less. By setting the carbon content to 0.20 mass % or more, good strength and hardness can be secured. Further, by setting the carbon content to 0.35 mass % or less, good formability and weldability during manufacturing the electroseamed pipe can be secured.

The forming step S10 is a step of bending the element pipe as the material of the hollow stabilizer to form the element pipe into the product shape including the bent portion. In this step, by bending the element tube, a pair of right and left bent portions 1c, 1c is formed, and the element pipe is formed into substantially the product shape in which the torsion portion 1a and the arms 1c are respectively continuous via the bent portions 1c. Excess weld of welded portions of the element pipe may be removed from only an outer surface of the element pipe, or from both the outer surface and an inner surface thereof. Bending process can be performed on plural portions to form the bent portions 1c depending on the desired product shape.

Forming of the element pipe is performed by the bending process. The bending process may be either molding using a total bending die or bending using a bender. The molding using the total bending die is particularly suitable. In general, in the molding using the total bending die, the bent outer portions of the element pipe are respectively pulled toward both pipe ends, and the cross-sectional shape of the bent portion 1c tends to be flattened. However, when the ratio (t/D) of the thickness (t) to the outer diameter (D) of the element pipe is 0.10 or more, since possibility of flattening is low, it is often possible to perform simultaneous multi-stage bending using the total bending die.

As a heating method in the bending process, an appropriate method such as heating with a heating furnace, electric heating, or high-frequency induction heating can be used. In the electric heating, the element pipe can be heat-treated while suppressing decarburization by rapid heating. Therefore, it is preferable to use the electric heating. Heating temperature in the molding is preferably about 900° C. or higher and about 1200° C. or lower. The molding at this temperature has good processability and high mass productivity. On the other hand, when the bending process is performed at 720° C. or lower, the bending using the bender may be performed in addition to the molding.

The quenching step S20 is a step of performing quenching of the element pipe which has been subjected to the bending process. Specifically, in this step, the steel pipe austenitized by heat treatment is subjected to the cooling process using a liquid coolant at or above a lower critical cooling rate.

Heat treatment of the element pipe can be performed by an appropriate method such as heating with the heating furnace, electric heating, or high-frequency induction heating. A particularly preferable method among them is the electric heating. The electric heating can be performed, for example, by respectively connecting clamps serving also as electrodes to both ends of the element pipe, to energize between the both ends of the element pipe. Since the electric heating can be performed with inexpensive processing equipment, and can also perform rapid heating, it is suitable for achieving good productivity. In addition, since it is possible to raise a temperature of the element pipe rapidly and uniformly in the longitudinal direction thereof, it is effective in that decarburization and thermal deformation can be suppressed. In the forming step S10, when performing hot bending using the total bending die, the heat treatment of the element pipe may be performed as a previous step of the bending process.

The heat treatment of the element pipe can also be performed by using a carburizing agent in combination. That is, in the quenching step S20, carburizing quenching can also be applied to the element pipe. Carburizing quenching can be applied to only the outer surface, only the inner surface, or both the outer surface and the inner surface of the element pipe. As a carburizing method, any one of a solid carburizing method, a gas carburizing method and a liquid carburizing method may be used. As the solid carburizing method, a carburizing accelerator such as barium carbonate ($BaCO_3$) is used with charcoal or bone charcoal. The gas carburizing method is performed by incomplete combustion and heating by mixing air in a furnace with a gas such as natural gas containing C. The liquid carburizing method is performed by heating in a salt bath containing NaCN or the like as a main component.

In carburizing quenching, the ratio (t/D) of the thickness (t) to the outer diameter (D) of the element pipe is preferably 0.10 or more and less than 0.275, more preferably 0.10 or more and less than 0.18. By performing carburizing quenching in such a range of the ratio (t/D) in which demand for quenching hardness of the inner surface is increased, in order to manufacture the hollow stabilizer 1 having a predetermined hardness on its surface, it is possible to avoid performing unnecessary carburizing quenching which does not contribute to increase fatigue strength. In addition, quenching effect in a quenching process described below can be more reliable regardless of a material of the element pipe. On the other hand, when the ratio (t/D) of the thickness (t) to the outer diameter (D) of the element pipe is 0.275 or more, the inner surface of the element pipe need not be subjected to carburizing quenching.

The cooling process (quenching process) of the element pipe can be performed by an appropriate method using the liquid coolant such as water quenching, aqueous quenching, salt water quenching or oil quenching. Water quenching is a method using water as the coolant. Water temperature can be in a range of about 0° C. or more and about 100° C. or less, preferably 5° C. or more and 40° C. or less. Aqueous quenching (polymer quenching) is a method using an aqueous solution added with a polymer as the coolant. As the polymer, for example, various polymers such as polyalkylene glycol and polyvinyl pyrrolidone can be used. Salt water quenching is a method using an aqueous solution added with salts such as sodium chloride as the coolant.

The cooling process can be performed at an appropriate cooling rate depending on the material, the thickness (t), the outer diameter (D) and the like of the element pipe. A particularly preferred cooling process is to perform water quenching. This is because water quenching can reduce disposal cost of used coolant and environmental load caused by the coolant. In addition, it is advantageous in terms of handling of the coolant itself and in that, for example, removal of the coolant from the element pipe after quenching can also be relatively easily performed.

Figure 4:
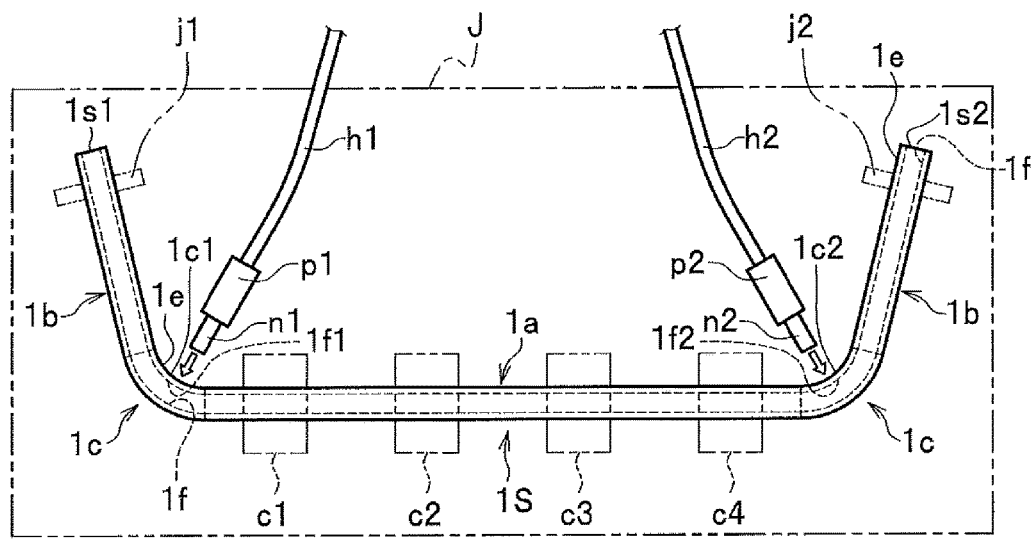
FIG. 4 is a top view showing a state in which quenching is locally performed on an inner portion of a bent portion of a bent element pipe from an outer surface of the bent portion.

FIG. 4 is a top view showing a state in which quenching is locally performed on the inner portion of the bent portion of the bent element pipe from the outer surface of the bent portion.

In the quenching step S20, as shown in FIG. 4, the bent element pipe 1S is introduced into a quenching bath (not shown) filled with the coolant, to be immersed in the coolant in the quenching bath, so that quenching is performed. FIG. 4 shows a state in which the element pipe 1S to be quenched is fixed to a quenching jig J and is immersed in the quenching bath together with the quenching jig J. The element pipe 1S is wholly immersed in the coolant with openings of both pipe ends 1s1, 1s2 being not closed. Therefore, most of an outer surface 1e of the element pipe 1S and an inner surface 1f of the element pipe 1S are both in contact with the coolant. In FIG. 4, a perspective cross-section of the element pipe 1S is indicated by broken lines, and a schematic shape of the quenching jig J is shown in a rectangular shape by two-dot chain lines.

As shown in FIG. 4, the quenching jig J includes clamps c1, c2, c3, c4 and support portions j1, j2. The quenching jig J supports the element pipe 1S to be quenched and facilitates conveyance of the element pipe 1S between an inside and an outside of the quenching bath. The quenching jig J may have a function of shaking the element pipe 1S in the coolant filled in the quenching bath.

The quenching jig J may be configured to include a main body in an appropriate form such as a plate shape, an assembly plate shape or a lath shape. Further, the quenching jig J can have an appropriate size capable of supporting the element pipe 1S to be quenched. The quenching jig J can be connected to a movable mechanism or the like (not shown) so that the element pipe 1S fixed to the quenching jig J outside the quenching bath can be transferred into the quenching bath, and the quenching jig J can be freely transferred between the inside and the outside of the quenching bath. In addition, the quenching jig J can be reciprocable in one axial direction or another axial direction by the movable mechanism (not shown) or the like so that the element pipe 1S can shake in the coolant. A rate of shaking is preferably 220 mm/sec or more, and more preferably 350 mm/sec or more. An upper limit of the rate of shaking is preferably about 650 mm/sec or less, although it depends on a fixed state of the element pipe 1S, a shaking state of the coolant, or the like.

The clamps c1, c2, c3, c4 are fixed on the quenching jig J, and detachably grip the element pipe 1S to be quenched. In FIG. 4, four clamps c1, c2, c3, c4 are provided on the torsion portion 1a, however, they can also be provided in an appropriate number or arrangement. However, the clamps c1, c2, c3, c4 are preferably provided at positions fixing at least one of straight tubular portions of the element pipe 1S, that is, at least one of the torsion portion 1a and the arms 1b so as to prevent thermal deformation of the element pipe 1S, and more preferably provided at a position where only the torsion portion 1a is fixed. Further, since restrained portions 1h (see FIG. 1B) in contact with the clamps c1, c2, c3, c4 in the outer surface of the element pipe 1S have reduced contact with the coolant and the cooling rate decreases, the restrained portions 1h are preferably provided at positions in a section away from the bent portions 1c.

The support portions j1, j2 are portions for supporting the element pipe 1S to be quenched. For example, the support portions j1, j2 are constituted by a base or the like so as to be higher than the quenching jig J and fixed on the quenching jig J. In FIG. 4, the support portions j1, j2 are provided on the pipe ends 1s1, 1s2 side of the arms 1b, however, they can also be provided in an appropriate number or arrangement. However, when the clamps c1, c2, c3, c4 are provided at positions to grip the torsion portion 1a, the support portions j1, j2 are preferably provided at least at positions to support the arms 1b.

In the method of manufacturing the hollow stabilizer according to the present embodiment, in the quenching step S20, the cooling process is performed by continuously spraying jet water flow (outer surface jet), which is jet flow of the coolant, onto outer surfaces 1e of inner portions 1c1, 1c2 of the bent portions 1c, 1c of the element pipe 1S immersed in the coolant. Spray of the coolant can be performed by a coolant spray means (n1, h1, p1, n2, h2, p2) shown in FIG. 4. It is preferred that spray of the coolant from the coolant spray means is started promptly as soon as the element pipe 1S is immersed in the quenching bath, and is continued at least until Ms transformation point is reached.

The coolant spray means includes nozzles (n1, n2), hoses (h1, h2) and small underwater pumps (p1, p2). As shown in FIG. 4, the coolant spray means are respectively arranged at both pipe ends 1s1, 1s2 of the element pipe 1S to be quenched. It is preferred that a relative position of the coolant spray means with respect to the element pipe 1S to be quenched is fixed during the cooling process. Therefore, when the element pipe 1S is shaken in the coolant, for example, the coolant spray means can be fixed to the quenching jig J, or provided integrally with the quenching jig J so that the coolant spray means also synchronize with the element pipe 1S.

The nozzles n1, n2 are portions for spraying the coolant. As shown in FIG. 4, it is preferred that one nozzle n1 is disposed so as to face the outer surface 1e of the inner portion 1c1 of one bent portion 1c of the element pipe 1S immersed in the coolant, and the other nozzle n2 is disposed so as to face the outer surface 1e of the inner portion 1c2 of the other bent portion 1c. When performing the electric heating in the quenching step S20, the inner portions 1c1, 1c2 of the bent portions 1c of the element pipe 1S tend to be easily heated to a high temperature due to concentration of current density. Therefore, it is advantageous in that the cooling rate can be effectively increased, when the coolant is directly sprayed onto the outer surfaces 1e of the bent inner portions 1c1, 1c2 of the bent portions 1c, 1c.

The hoses h1, h2 connect the nozzles n1, n2 and a coolant supply source (not shown) via the pumps p1, p2. The hose n1 preferably includes a flexible tube of a bellows structure made of rubber, resin, metal, for example, stainless steel (SUS), and it is not particularly limited as long as the hose n1 has a function such as flexibility or rust-prevention capable of supplying the coolant water smoothly for a long time. The hoses h1, h2 form flow paths through which the coolant flow from the coolant supply source to the pumps p1, p2. As the coolant supply source, for example, the quenching bath itself filled with the coolant or a coolant storage tank storing the coolant to be supplied to the quenching bath can be used. That is, the hoses h1, h2 may communicate with the inside of the quenching bath, and the coolant in the quenching bath may be cyclically sprayed from the nozzles n1, n2, or the hoses n1, n2 may communicate with the coolant storage tank or the like, and the coolant newly supplied from the outside of the quenching bath may be sprayed from the nozzles n1, n2.

By performing the cooling process in which the coolant is sprayed to the outer surfaces 1e of the inner portions 1c1, 1c2 of the bent portion 1c of the element pipe 1S immersed in the coolant by the above-described coolant spray means (n1, h1, p1, n2, h2, p2), it is possible to increase a heat transfer coefficient between the outer surfaces 1e of the bent inner portions 1c1, 1c2 of the bent portion 1c of the element pipe 1S and the coolant around the bent portion 1c. Therefore, it is possible to further increase the cooling rate of the bent portion 1c of the element pipe 1S. As a result, it is possible to increase a generation ratio of martensite in not only the outer surface 1e but also the inner surface 1f of the bent portion 1c of the hollow stabilizer 1. By securing the hardness of the outer surface 1e and the inner surface 1f of the bent portion 1c, it is possible to manufacture the hollow stabilizer 1 having good fatigue durability. A flow rate of the outer surface jet by the coolant spraying means is preferably 8.5 liters/min or more and 2000 mm/sec or more.

The tempering step S30 is a step of applying tempering to the quenched element pipe. In particular, in this step, after heating the element pipe to a predetermined temperature at or below AC1 transformation point, the cooling process is appropriately performed. Heat treatment of the element pipe can be performed by an appropriate method such as heating with the heating furnace, electric heating or high-frequency induction heating. Tempering temperature can be an appropriate temperature depending on desired product specifications, however, it is usually preferably 200° C. or more and less than 400° C., more preferably 200° C. or more and 290° C. or less, and further more preferably 230° C. or more and 270° C. or less. Meanwhile, the cooling process of the element pipe can be performed by an appropriate method such as water cooling or air cooling, and in an appropriate time. The tempering step S30 can be omitted depending on the material or the product specifications of the hollow stabilizer 1 to be manufactured.

The pipe end processing step S40 is a step of forming the connecting portions by subjecting the element pipe to pipe end processing. In this step, for example, the end of the bent element pipe is plastically deformed by compression by pressing to be formed into a flat shape, and then a hole is drilled with a hole forming die. Thus, the connecting portions 1d, 1d respectively having the mounting holes 1d1, 1d1 are formed at the ends of the bent element pipe. A shape and forming method of the connecting portions 1d and 1d are not particularly limited.

The surface processing step S50 is a step of applying shot peening to the outer surface of the element pipe. Shot peening may be performed at about 900° C. or less or about 720° C. or less, and may be repeated a plurality of times while changing conditions such as a particle size and a projection speed. By applying shot peening, compressive residual stress is added to the surface of the hollow stabilizer 1, to improve fatigue strength and abrasion resistance, as well as to prevent season cracking, stress corrosion cracking and the like. Shot peening is, for example, effective for improving the durability of the hollow stabilizer 1 having the t/D of about 0.18 or less. The surface processing step S50 can be omitted depending on the material or the product specifications of the hollow stabilizer 1.

The coating step S60 is a step of coating the surface of the element pipe. In this step, in order to perform coating on the element pipe, surface cleaning and surface processing are performed first. Various pretreatments such as a removing process for removing oils and fats and foreign matters and the like and a base treatment are applied to the surface of the element pipe. As the base treatment, for example, a film of zinc phosphate, iron phosphate or the like can be formed. Then, the element pipe is coated with a coating material. As the coating material, a powder coating material is preferably used, and for example, a powder coating material made of epoxy resin can be suitably used. As a coating method, for example, a method of spraying the coating material so that a coating film having a thickness of about 50 μm or more is formed on the surface of the hollow stabilizer 1, or a method of immersing the element pipe in the coating material can be used. When using the powder coating material, the heat treatment for baking may be performed by heating with the heating furnace or by infrared heating. As a coating process, electrodeposition coating, solvent coating or the like may be performed.

Through the above steps, the hollow stabilizer 1 can be manufactured. In the quenching step S20, since the manufactured hollow stabilizer 1 has been subjected to the quenching process in which the cooling rate of the bent portion 1c of the element pipe is increased, high quenching hardness close to a target hardness is realized in not only the outer surface 1e but also the inner surface 1f of the bent portion 1c. Therefore, with the method of manufacturing the hollow stabilizer according to the present embodiment, the hollow stabilizer 1 having good fatigue durability can be manufactured.

Next, a method of manufacturing the hollow stabilizer according to another embodiment of the present invention will be described.

Figure 5:
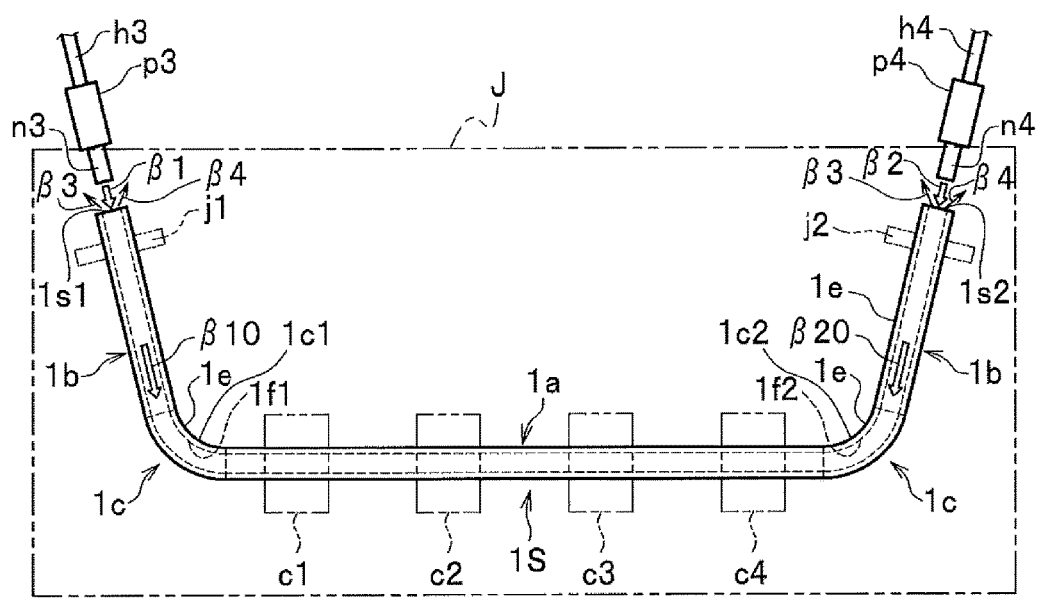
FIG. 5 is a top view showing a state in which quenching is performed on the bent element pipe from an inner surface of the bent element pipe by a quenching method using inner surface jet.

FIG. 5 is a top view showing a state in which quenching is performed on the bent element pipe from the inner surface of the bent element pipe by a quenching method using inner surface jet.

In the method of manufacturing the hollow stabilizer, in the quenching step S20, in place of the cooling process (see FIG. 4) for spraying the coolant to the outer surfaces of the inner portions 1c1, 1c2 of the bent portions 1c, 1c of the element pipe 1S, a cooling process is employed in which the element pipe 1S is immersed in the coolant and the coolant is injected (inner surface jet) into the element pipe 1S (see FIG. 5). The coolant can be injected by a coolant injection means (n3, h3, p3, n4, h4, p4) shown in FIG. 5. It is preferred that injection of the coolant is preferably started promptly as soon as the element pipe 1S is immersed in the quenching bath, and is continued at least until the Ms transformation point is reached. From a viewpoint of suppressing a difference in cooling rate between the outer surface and the inner surface of the element pipe 1S, it is preferable to inject the coolant into the element pipe 1S and to shake the element pipe 1S.

In this manufacturing method, the ratio (t/D) of the thickness (t) to the outer diameter (D) of the element pipe of the hollow stabilizer 1 is preferably 0.10 or more, and more preferably 0.25 or more and less than 0.275. When the ratio (t/D) of the thickness (t) to the outside diameter (D) of the pipe is 0.10 or more, it can be suitably used as the material as described above. On the other hand, when the ratio (t/D) of the thickness (t) to the outer diameter (D) of the pipe is less than 0.275, the stress (main stress) generated on the inner surface of the hollow stabilizer 1 increases, and the inner surface stress closer to the outer surface to be quenched by targeting an ideal hardness of each material is generated (see FIG. 2). Therefore, in this case, it is advantageous to employ the cooling process for injecting the coolant into the element pipe 1S in that the hardness of the inner surface can be increased. On the other hand, in the steel pipe having a ratio (t/D) of the pipe thickness (t) to the outer diameter (D) of 0.275 or more, since contribution of the hardness of the inner surface is low with respect to fatigue durability of the hollow stabilizer, it is not necessary to use the cooling process for injecting the coolant into the element pipe 1S.

As shown in FIG. 5, the coolant injection means includes nozzles (n3, n4), hoses (h3, h4) and small underwater pumps (p3, p4). The coolant injection means are respectively arranged at the both pipe ends 1s1, 1s2 of the element pipe 1S to be quenched. It is preferred that a relative position of the coolant injection means with respect to the element pipe 1S to be quenched is fixed during the cooling process. Therefore, when the element pipe 1S is shaken in the coolant, for example, the coolant injection means can be fixed to the quenching jig J, or provided integrally with the quenching jig J so that the coolant injection means also synchronize with the element pipe 1S.

The nozzles n3, n4 are portions for ejecting the coolant. The nozzles n3, n4 are respectively arranged close to the both pipe ends 1s1, 1s2 of the element pipe 1S immersed in the coolant and substantially concentric with the openings of the both pipe ends 1s1, 1s2. As shown in FIG. 5, distal ends of the nozzles n3, n4 are arranged at positions slightly spaced apart from the pipe ends 1s1, 1s2, so that it is secured that the coolant freely enters and exits between an inside of the element pipe 1S and the quenching bath. Other components of the coolant injection means (n3, h3, p3, n4, h4, p4) can be the same as those of the coolant spray means (n1, h1, p1, n2, h2, p2).

By performing the cooling process of injecting the coolant into the element pipe 1S immersed in the coolant by the above-described coolant injection means (n3, h3, p3, n4, h4, p4), the coolant ejected at a high pressure from the nozzles n3, n4 is injected into the element pipe 1S from the pipe ends 1s1, 1s2 of the element pipe 1S (white arrows (β1, β2 in FIG. 5). Then, after flowing through the inside of the element pipe 1S, the coolant is discharged from the pipe ends 1s1, 1s2 (arrows β3, β4 in FIG. 5). In this way, it is possible to increase a heat transfer coefficient between the inner surface 1f of the element pipe 1S and the coolant flowing through the inside of the element pipe 1S, thereby increasing the cooling rate of the inner surface of the element pipe 1S to a level close to the outer surface to be cooled by targeting the ideal hardness. As a result, it is possible to increase the generation ratio of martensite in the inner surface 1f of the hollow stabilizer 1, particularly in the inner surfaces 1f1, 1f2 of the bent portions 1c, 1c and the inner surface 1f of the restrained portions 1h. Since the hardness of the inner surface 1f of the hollow stabilizer 1 is secured, it is possible to manufacture the hollow stabilizer 1 having good fatigue durability. A flow rate of the inner surface jet by the coolant injection means is preferably 8.5 liters/min or more and 2000 mm/sec or more, although depending on an inner diameter of the element pipe 1S, a length of the arm 1b, a shape of the bent portion 1c and the like.

The coolant injection means (n3, h3, p3, n4, h4, p4) arranged at the both pipe ends 1s1, 1s2 of the element pipe 1S are preferably set such that a flow rate of the coolant injected from the nozzles n3, n4 is increased around a center of the inside of the element pipe 1S. By allowing the injection of the coolant to reach around the inner surfaces 1f1, 1f2 of the bent portions 1c, 1c (white arrows β10 and β20 in FIG. 5), it is possible to efficiently discharge the coolant from a peripheral wall side of the both pipe ends 1s1, 1s2 of the element pipe 1S as indicated by arrows in FIG. 5 (arrows β3 and β4 in FIG. 5). By injecting the coolant from the both pipe ends 1s1, 1s2 of the element pipe 1S by the coolant injection means (n3, h3, p3, n4, h4, p4) arranged at the both pipe ends 1s1, 1s2 of the element pipe 1S, it is possible to suppress thermal deformation occurring in an axial direction of the element pipe 1S.

The coolant injection means (n3, h3, p3, n4, h4, p4) arranged at the both pipe ends 1s1, 1s2 of the element pipe 1S may simultaneously inject the coolant from the both pipe ends 1s1, 1s2 or may alternately inject the coolant. By simultaneously injecting the coolant from the both pipe ends 1s1, 1s2, the cooling rate of the inner surface 1f of the element pipe 1S, in particular, the inner surfaces 1f1, 1f2 of a pair of left and right bent portions 1c, 1c can be made uniform and rapid. On the other hand, when the coolant is alternately injected from the both pipe ends 1s1, 1s2 at an appropriate injection interval, it is possible to increase the cooling rate of the inner surfaces 1f1, 1f2 of the bent portions 1c, 1c of the steel pipe and to suppress the warmed coolant from accumulating around a center of the torsion portion 1a, and thus it is easy to increase uniformity of the cooling rate in the axial direction between the both pipe ends 1s1, 1s2 of the element pipe 1S.

Next, a method of manufacturing a hollow stabilizer according to a modified example of the present invention will be described.

Figure 6:
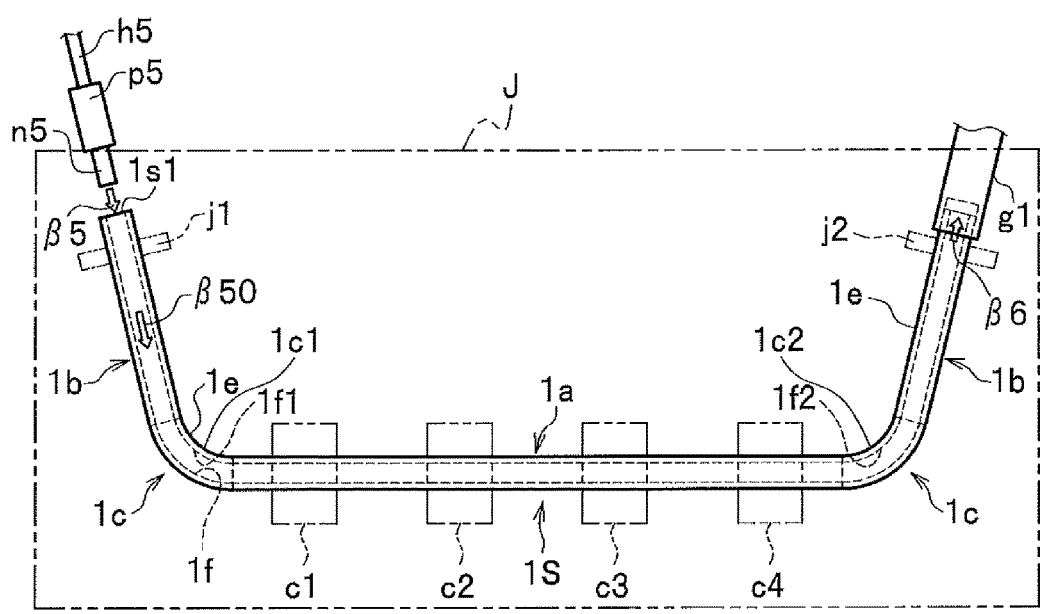
FIG. 6 is a top view showing a state in which quenching is locally performed on the bent element pipe from the inner surface of the bent element pipe by a quenching method using inner surface jet of another example.

FIG. 6 is a top view showing a state in which quenching is locally performed on the bent element pipe from the inner surface of the bent element pipe by a quenching method using inner surface jet of another example.

In the method of manufacturing the hollow stabilizer according to the other embodiment, the coolant injection means (n3, h3, p3, n4, h4, p4) used for the cooling process in the quenching step S20 are arranged at the both pipe ends 1s1, 1s2 of the element pipe 1S, and the coolant is injected into the element pipe 1S from the both pipe ends 1s1, 1s2 (see FIG. 5). However, instead of this, as shown in FIG. 6, another method can also be employed in which the coolant injection means (n5, h5, p5) is disposed only at one pipe end 1s1 of the element pipe 1S and the coolant flows through the element pipe 1S in one direction.

As shown in FIG. 6, the coolant injection means includes a nozzle n5, a hose h5 and a small underwater pump p5. Other components of the coolant injection means (n5, h5, p5) can be the same as those of the coolant injection means (n3, h3, p3, n4, h4, p4). The coolant injection means (n5, h5, p5) is disposed only at the one pipe end 1s1 of the element pipe 1S to be quenched. At the other pipe end 1s2, an injection guard g1 is disposed.

The injection guard g1 covers the pipe end 1s2 of the element pipe 1S fixed to the quenching jig J. The injection guard g1 has a larger diameter than that of the element pipe 1S so that an inner surface of the injection guard g1 is separated from the element pipe 1S. When the coolant injected into the element pipe 1S is discharged from the pipe end 1s2, it collides with the injection guard g1 to obtain an effect that the flow rate of the discharged jet water flow is reduced.

By performing the cooling process for injecting the coolant into the element pipe 1S immersed in the coolant by the above-described coolant injection means (n5, h5, p5), the coolant ejected at high pressure from the one nozzle n5 is injected into the element pipe 1S from the one pipe end 1s1 of the element pipe 1S (a white arrow β5 in FIG. 6). Then, the coolant flows through the inside of the element pipe 1S, and is discharged from the other pipe end 1s2 (a white arrow β6 in FIG. 6). In this way, it is possible to increase the heat transfer coefficient between the inner surface 1f of the element pipe 1S and the coolant flowing through the inside of the element pipe 1S, thereby increasing the cooling rate of the inner surface of the element pipe 1S to the level close to the outer surface to be cooled by targeting the ideal hardness. As a result, it is possible to increase the generation ratio of martensite in the inner surface 1f of the hollow stabilizer 1, particularly in the inner surfaces 1f1, 1f2 of the bent portions 1c, 1c and the inner surface 1f of the restrained portions 1h. Since the hardness of the inner surface 1f of the hollow stabilizer 1 is secured, it is possible to manufacture the hollow stabilizer 1 having good fatigue durability.

In the method of manufacturing the hollow stabilizer according to the other embodiment described above, the cooling process by the inner surface jet using the coolant injection means can be performed together with the cooling process by the outer surface jet using the coolant spraying means. That is, in the quenching step S20, it is possible to immerse the element pipe in the coolant, inject the coolant into the element pipe, and spray the coolant to the outer surface of the bent portion to perform the cooling process. In this case, the coolant injection means may be disposed only on one end side of the element pipe to be quenched or may be arranged on both end sides of the element pipe. As for a mode in which the cooling process is performed by spraying the coolant to the outer surface of the bent portion without injecting the coolant into the element pipe, formation of the connecting portions 1d performed in the pipe end processing step S40 may be performed in the forming step S10.

Although the present invention will be described in more detail by way of examples of the present invention below, a technical scope of the present invention is not limited thereto.

Example 1

As Example 1, the method of manufacturing the hollow stabilizer was performed in a mode in which the cooling process was performed by immersing the element pipe as the material of the hollow stabilizer in the coolant and by spraying the coolant to the outer surface of the bent portion. Then, hardness distribution at the bent portion of the manufactured hollow stabilizer was evaluated. In Example 1, a plurality of test materials (Example 1-1, Example 1-2) using as the material an SR steel pipe having the thickness (t) of 7.5 mm, the outer diameter (D) of 30 mm, and the ratio (t/D) of the tube thickness (t) to the outer diameter (D) of 0.25, were evaluated.

Comparative Example 1

As Comparative Example 1, a method of manufacturing the hollow stabilizer was performed in the same manner as in Example 1 except that the cooling process was performed without spraying the coolant to the outer surface of the bent portion of the element pipe as the material of the hollow stabilizer. For comparison with Example 1, the manufactured hollow stabilizer was evaluated. In Comparative Example 1, in the same manner as in Example 1, a plurality of test materials (Comparative Example 1-1, Comparative Example 1-2) using as the material the SR steel pipe having the thickness (t) of 7.5 mm, the outer diameter (D) of 30 mm, and the ratio (t/D) of the tube thickness (t) to the outer diameter (D) of 0.25, were evaluated.

Figure 7:
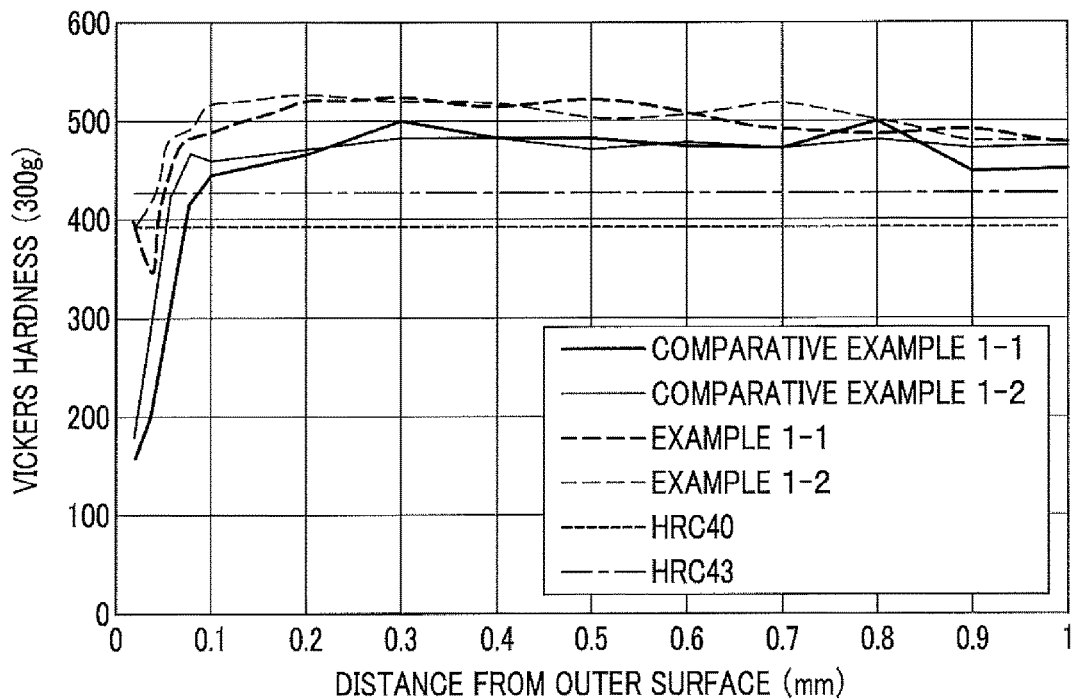
FIG. 7 is a graph showing an effect due to outer surface jet by hardness.

FIG. 7 is a graph showing an effect due to the outer surface jet by hardness.

In FIG. 7, the horizontal axis represents a distance (depth) (mm) from the outer surface of the bent inner portion of the bent portion, and the vertical axis represents Vickers hardness (HV) at a test force of 300 gf. A thick solid line is a measured value of the hollow stabilizer according to Comparative Example 1-1, a thin solid line is a measured value of the hollow stabilizer according to Comparative Example 1-2, a thick broken line is a measured value of the hollow stabilizer according to Example 1-1, and a thin broken line is a measured value of the hollow stabilizer according to Example 1-2. In addition, FIG. 7 also shows reference lines converted into Rockwell hardness HRC 40 and HRC 43.

As shown in FIG. 7, in the quenching step S20, it is understood that quenching hardness of the bent portion is increased in the hollow stabilizers according to Examples 1-1 and 1-2, as compared with the hollow stabilizers according to Comparative Examples 1-1 and 1-2. In addition, it can be confirmed that uniformity of hardness distribution in a depth direction from the outer surface is relatively good. Therefore, it is recognized that the method of manufacturing the hollow stabilizer in the mode in which the cooling process is performed by spraying the coolant to the outer surface of the bent portion is effective for improving fatigue durability, for example, in consideration of concentration of the stress in actual use.

Example 2

As Example 2, the method of manufacturing the hollow stabilizer was performed in a mode in which the cooling process was performed by immersing the element pipe as the material of the hollow stabilizer in the coolant and by injecting the coolant into the steel pipe. Then, fatigue durability of the manufactured hollow stabilizer was evaluated. As shown in FIG. 5, the coolant was injected into the element pipe from the both ends of the element pipe to be quenched. As the material of the hollow stabilizer, the SR steel pipe having the thickness (t) of 7.5 mm, the outer diameter (D) of 30 mm, and the ratio (t/D) of the tube thickness (t) to the outer diameter (D) of 0.25 was used.

Comparative Example 2

As Comparative Example 2, a method of manufacturing the hollow stabilizer was performed in the same manner as in Example 2 except that the cooling process was performed without injecting the coolant into the element pipe as the material of the hollow stabilizer. For comparison with Example 2, the manufactured hollow stabilizer was evaluated.

Figure 8:
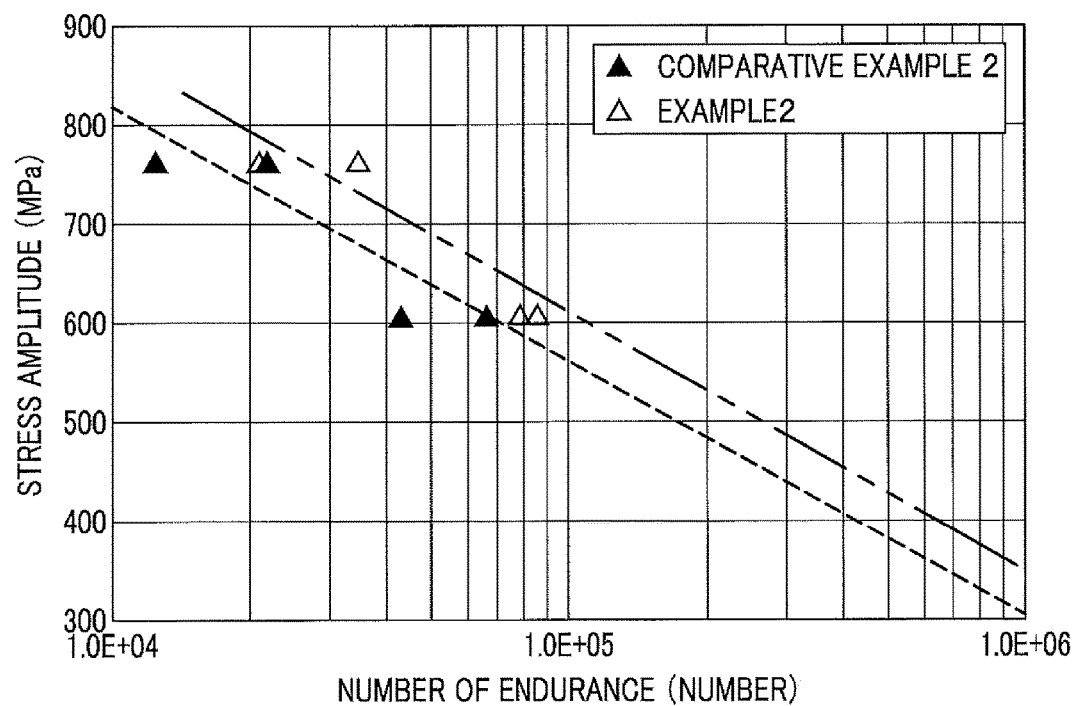
FIG. 8 is an S—N diagram derived from a fatigue test, which shows an effect of water quenching and quenching by inner surface jet in comparison with a case of only water quenching.

FIG. 8 is an S—N diagram derived from a fatigue test, which shows an effect of water quenching and quenching by the inner surface jet in comparison with a case of only water quenching.

In FIG. 8, a two-dot chain line shows a result obtained by averaging cumulative breakage probability of 50% under the Weibull distribution for the hollow stabilizer products subjected to a conventional cooling process, and a broken line shows a result obtained by averaging cumulative breakage probability of 10% under the Weibull distribution. Plots of ▲ (black triangle) are measured values in the hollow stabilizer according to Comparative Example 2 and plots of ∆ (white triangle) are measured values in the hollow stabilizer according to Example 2.

As shown in FIG. 8, although the hollow stabilizer according to Example 2 is made of SR steel pipe having a relatively large ratio (t/D) of the pipe thickness (t) to the outer diameter (D) of 0.25, fatigue durability is improved as compared with the hollow stabilizer according to Comparative Example 2, and it can be confirmed that breakage probability is suppressed to a low level. Therefore, it is recognized that the method of manufacturing the hollow stabilizer in the mode of injecting the coolant into the element pipe to perform the cooling process is effective for improving fatigue durability.

REFERENCE SIGNS LIST

1: stabilizer
1a: torsion portion
1b: arm
1c: bent portion
1d: connecting portion
1e: outer surface
1f: inner surface
1h: restrained portion
2: stabilizer link
3: suspension device
3a: axle portion
4: bush
c1, c2, c3, c4: clamp
j1, j2: support portion
n1, n2: nozzle (coolant spray means)
h1, h2: hose (coolant spray means)
p1, p2: small underwater pump (coolant spray means)
J: quenching jig
S10: forming step
S20: quenching step
S30: tempering step
S40: pipe end processing step
S50: surface processing step
S60: coating step

The invention claimed is:

1. A method of manufacturing a hollow stabilizer, which is provided in a vehicle, the hollow stabilizer including a torsion portion extending in a vehicle width direction; an arm extending in a vehicle front-rear direction; and a bent portion connecting the torsion portion and the arm, wherein the method comprises:
    a forming step of subjecting an element pipe as a material of the hollow stabilizer to a bending process, to form a product shape including the bent portion; and
    a quenching step of quenching the element pipe subjected to the bending process, and
    in the quenching step, a cooling process is performed by immersing the element pipe in coolant and by spraying the coolant to an outer surface of the bent portion.

2. The method of manufacturing the hollow stabilizer according to claim 1, wherein a ratio (t/D) of a thickness (t) to an outer diameter (D) of the element pipe is 0.10 or more.

3. The method of manufacturing the hollow stabilizer according to claim 1, and spraying the coolant to an outer surface of a bent inner portion of the bent portion in the quenching step.

4. The method of manufacturing the hollow stabilizer according to claim 1, wherein in the quenching step, a cooling process is performed by immersing the element pipe in coolant to inject the coolant into the element pipe and by spraying the coolant to the outer surface of the bent portion.

5. The method of manufacturing the hollow stabilizer according to claim 1, further comprising a tempering step of tempering the element pipe which has been quenched.

6. The method of manufacturing the hollow stabilizer according to claim 5, further comprising a surface processing step of applying shot peening to an outer surface of the element pipe which has been tempered.

7. The method of manufacturing the hollow stabilizer according to claim 1, wherein in the forming step, a bending process using a total bending die is applied to the element pipe which has been heated.

8. The method of manufacturing the hollow stabilizer according to claim 1, wherein in the quenching step, the element pipe is subjected to carburizing quenching.

9. A method of manufacturing a hollow stabilizer, which is provided in a vehicle, the hollow stabilizer including a torsion portion extending in a vehicle width direction; an arm extending in a vehicle front-rear direction; and a bent portion connecting the torsion portion and the arm, wherein the method comprises:
- a forming step of subjecting an element pipe as a material of the hollow stabilizer to a bending process, to form a product shape including the bent portion; and
- a quenching step of quenching the element pipe subjected to the bending process, and
- in the quenching step, a cooling process is performed by immersing the element pipe in coolant and by injecting the coolant into the element pipe.

10. The method of manufacturing the hollow stabilizer according to claim 9, wherein a ratio (t/D) of a thickness (t) to an outer diameter (D) of the element pipe is greater than or equal to 0.10 and less than 0.275.

11. The method of manufacturing the hollow stabilizer according to claim 8, wherein a ratio (t/D) of a thickness (t) to an outer diameter (D) of the element pipe is equal to or more than 0.10 and less than 0.18.

12. The method of manufacturing the hollow stabilizer according to claim 9, further comprising a tempering step of tempering the element pipe which has been quenched.

13. The method of manufacturing the hollow stabilizer according to claim 12, further comprising a surface processing step of applying shot peening to an outer surface of the element pipe which has been tempered.

14. The method of manufacturing the hollow stabilizer according to claim 9, wherein in the forming step, a bending process using a total bending die is applied to the element pipe which has been heated.

15. The method of manufacturing the hollow stabilizer according to claim 9, wherein in the quenching step, the element pipe is subjected to carburizing quenching.

16. The method of manufacturing the hollow stabilizer according to claim 15, wherein a ratio (t/D) of a thickness (t) to an outer diameter (D) of the element pipe is equal to or more than 0.10 and less than 0.18.

* * * * *